(12) United States Patent
Noma et al.

(10) Patent No.: US 9,487,175 B2
(45) Date of Patent: Nov. 8, 2016

(54) CURTAIN AIRBAG DEVICE (71) Applicant: Autoliv Development AB, Vårgårda (SE)

(72) Inventors: Hiroshi Noma, Yokohama (JP); Takashi Murayama, Yokohama (JP); Kazuaki Kobayashi, Yokohama (JP); Tomokazu Oikawa, Yokohama (JP); Hiroyuki Tomichi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/434,413

(22) PCT Filed: Oct. 2, 2013

(86) PCT No.: PCT/JP2013/076841
§ 371 (c)(1),
(2) Date: Apr. 9, 2015

(87) PCT Pub. No.: WO2014/061452
PCT Pub. Date: Apr. 24, 2014

(65) Prior Publication Data
US 2015/0291119 A1 Oct. 15, 2015

(30) Foreign Application Priority Data
Oct. 19, 2012 (JP) ................................ 2012-232383

(51) Int. Cl.
*B60R 21/201* (2011.01)
*B60R 21/214* (2011.01)
(Continued)

(52) U.S. Cl.
CPC ........... *B60R 21/201* (2013.01); *B60R 21/213* (2013.01); *B60R 21/214* (2013.01); *B60R 21/215* (2013.01); *B60R 21/232* (2013.01); *B60R 21/237* (2013.01)

(58) Field of Classification Search
CPC . B60R 21/201; B60R 21/213; B60R 21/214; B60R 21/215; B60R 21/232; B60R 21/237
See application file for complete search history.

(56) References Cited

U.S. PATENT DOCUMENTS 7,125,037 B2 * 10/2006 Tallerico ............... B60R 21/201
280/728.2
7,328,911 B2 * 2/2008 Chapman ................ B60R 21/20
280/728.2
(Continued)

FOREIGN PATENT DOCUMENTS

CN 1935562 A 3/2007
CN 101934773 A 1/2011
(Continued)

OTHER PUBLICATIONS

Japanese Patent Office, English Translation of International Search Report of PCT International Application No. PCT/JP2013/076841, Mailed on Nov. 12, 2013, two pages.

Primary Examiner — Barry Gooden, Jr.
(74) Attorney, Agent, or Firm — Brinks Gilson & Lione (57) ABSTRACT A curtain airbag device having a cushion portion connected to a bracket. The airbag includes a cushion portion that is accommodated in a long and narrow form, a bracket attached to a wall of a vehicle cabin, and a wrapping member that is wrapped around the cushion portion and the bracket. The bracket includes a base portion having an insertion hole, a vehicle fixing portion extending upward from the base portion, and protruding portions formed on both sides at a lower height than the vehicle fixing portion. The wrapping member has a root portion connected to the cushion portion and has hooking holes formed in a distal end thereof. The wrapping member is inserted into the insertion hole from the vehicle interior, folded back downward, and wrapped around the cushion portion toward the interior, and the hooking holes are hooked on the protruding portions.

24 Claims, 10 Drawing Sheets (51) Int. Cl.
   *B60R 21/213*   (2011.01)
   *B60R 21/232*   (2011.01)
   *B60R 21/215*   (2011.01)
   *B60R 21/237*   (2006.01)

(56) References Cited

U.S. PATENT DOCUMENTS

| | | | | |
|---|---|---|---|---|
| 8,240,701 | B2* | 8/2012 | Cheal | B60R 21/201 280/728.2 |
| 8,876,150 | B2* | 11/2014 | Min | B60R 21/232 280/728.2 |
| 9,139,151 | B2* | 9/2015 | Beppu | B60R 21/215 |
| 2003/0184057 | A1* | 10/2003 | Kumagai | B60R 21/213 280/728.3 |
| 2005/0212275 | A1* | 9/2005 | Hasebe | B60R 21/201 280/743.1 |
| 2007/0063490 | A1 | 3/2007 | Minamikawa | |
| 2008/0284142 | A1* | 11/2008 | Cheal | B60R 21/201 280/730.2 |
| 2010/0327564 | A1* | 12/2010 | Cheal | B60R 21/201 280/728.2 |
| 2011/0042923 | A1* | 2/2011 | Hatfield | B60R 21/201 280/730.2 |
| 2011/0057422 | A1* | 3/2011 | Cheal | B60R 21/201 280/728.2 |
| 2015/0367810 | A1* | 12/2015 | Gilles | B60R 21/201 280/730.1 |

FOREIGN PATENT DOCUMENTS

| | | |
|---|---|---|
| DE | 602006016384 D1 | 10/2010 |
| EP | 1 764 271 A2 | 3/2007 |
| JP | 2007-83781 A | 4/2007 |
| JP | 2011-105159 A | 6/2011 |
| JP | 2012-101595 A | 5/2012 |
| WO | 2011/001986 A1 | 1/2011 |
| WO | 2012/063702 A1 | 5/2012 |

* cited by examiner

ENLARGED VIEW OF PORTION A

ENLARGED VIEW OF PORTION C (b)

CURTAIN AIRBAG DEVICE

BACKGROUND

1. Field of the Invention

The present invention relates to a curtain airbag having a cushion portion that is inflated and deployed along a side surface of a vehicle interior for the purpose of protecting occupants in the event of a side collision or a rollover (overturning) of a vehicle.

2. Description of Related Art

In recent years, most vehicles are standard-equipped with airbags as safety devices. In a general airbag, when sensors detect an impact, an inflator (a gas generator) generates gas, and a cushion portion is inflated and deployed with the gas pressure. In the case of a front airbag, for example, the cushion portion is accommodated in the center of a steering wheel in a folded state. In the case of a curtain airbag, for example, the cushion portion is accommodated in the vicinity of an upper portion of a side door in a rolled state in a roll form.

The cushion portion in an accommodated state needs to maintain the folded or rolled state. For example, in the case of a front airbag, since the cushion portion is accommodated in a housing that also functions as a horn switch, the accommodated form is maintained. On the other hand, in the case of a curtain airbag, since the cushion portion has a long shape, the cushion portion does not have a dedicated housing capable of accommodating the entire cushion portion and the accommodated form thereof is maintained using a tape or the like (see Japanese Patent Application Publication No. 2007-83781, for example).

In Japanese Patent Application Publication No. 2007-83781, a cushion portion is attached to a vehicle using mounting components (so-called brackets). Moreover, a tape is wrapped around the cushion portion and the brackets so that the cushion portion is connected to the brackets while maintaining the accommodated form of the cushion portion. However, when an adhesive tape is used, there is a problem in that correction of misalignment of the cushion portion is not allowable unless the tape is attached again, and that the adhesive force might make an attachment operation complex.

SUMMARY

Therefore, an object of the present invention is to provide a curtain airbag device capable of connecting a cushion portion and a bracket with a simple structure and a simple operation and maintaining an accommodated form of the cushion portion reliably.

According to an aspect of the present invention, there is provided a curtain airbag device including: a cushion portion which is mounted on a vehicle in an accommodated form having a long and narrow shape by being rolled or folded; a bracket attached to a wall inside a vehicle cabin; and a wrapping member having a strip shape, wrapped around the cushion portion in the accommodated form and the bracket so as to connect the cushion portion and the bracket, wherein the bracket includes: a base portion having a horizontally long insertion hole; a vehicle fixing portion which extends upward from the base portion and makes contact with and is fixed to the wall; and protruding portions that protrude upward from the base portion on both sides in a width direction of the vehicle fixing portion and are lower in height than the vehicle fixing portion, the wrapping member has a root portion connected to an upper edge of the cushion portion, and hooking holes formed on both ends in a width direction of a distal end of the wrapping member, and the wrapping member is inserted into the insertion hole, folded back toward a lower side of the bracket from the insertion hole, rolled toward a vehicle interior side from the lower side of the bracket, and wrapped around the cushion portion in the accommodated form, and the hooking holes are hooked on the protruding portions.

According to the configuration, it is possible to connect the cushion portion and the bracket with a simple process using the wrapping member connected to the cushion portion. In particular, since a structure in which the wrapping member is hooked on the protruding portions is used, it is possible to wrap the wrapping member without any sagging while preventing interference between the wrapping member and the vehicle fixing portion. Thus, it is possible to maintain the accommodated form of the cushion portion reliably and to stabilize the deployment behavior. Moreover, since the protruding portions are lower in height than the vehicle fixing portion, it is possible to shorten the wrapping member and to reduce the diameter of the entire wrapped portion.

According to another aspect of the present invention, there is provided a curtain airbag device including: a cushion portion which is mounted on a vehicle in an accommodated form having a long and narrow shape by being rolled or folded; a bracket attached to a wall inside a vehicle cabin; a fabric tab that connects the bracket and the cushion portion; and a wrapping member having a strip shape, wrapped around the cushion portion in the accommodated form and the bracket so as to connect the cushion portion and the bracket, wherein the bracket includes: a base portion having an insertion hole; a vehicle fixing portion which extends upward from the base portion and makes contact with and is fixed to the wall; and protruding portions that protrude upward from the base portion on both sides in a width direction of the vehicle fixing portion and are lower in height than the vehicle fixing portion, the tab is inserted into the insertion hole of the bracket and connected to an upper edge of the cushion portion, the wrapping member has a root portion connected to at least one of the upper edge of the cushion portion and the tab, and hooking holes formed on both ends in a width direction of a distal end of the wrapping member, and the wrapping member is rolled toward a vehicle interior side from the root portion on a lower side of the bracket and wrapped around the cushion portion in the accommodated form, and the hooking holes are hooked on the protruding portions.

It is possible to connect the cushion portion and the bracket with a simple process using the tab and the wrapping member. In this configuration, since a structure in which the wrapping member is hooked on the protruding portions is used, it is possible to wrap the wrapping member without any sagging while preventing interference between the wrapping member and the vehicle fixing portion. Thus, it is possible to maintain the accommodated form of the cushion portion reliably and to stabilize the deployment behavior.

Each of the protruding portions may have a neck portion which is formed close to the base portion and has a smaller width than that of other regions of the protruding portion. The neck portion makes it easy to hook the hooking holes to thereby facilitate the operation and stabilize the accommodated form.

The wrapping member may have stretching properties. With this configuration, the hooking holes can be easily hooked on the protruding portions. Moreover, the present invention can be ideally implemented even when the wrapping member is formed of a non-woven fabric.

The wrapping member may have a weak portion that breaks with inflation and deployment of the cushion portion. With this configuration, the cushion portion can be inflated and deployed more smoothly. The weak portion may be a slit formed in a broken line shape. With this, a weak portion that is easily broken can be ideally implemented.

The cushion portion in the accommodated form may be mounted on the vehicle in contact with the vehicle interior side of the base portion. Since the cushion portion is in contact with the base portion, the cushion portion can receive repulsive force applied from the base portion toward the vehicle interior side during inflation and deployment. Moreover, since the cushion portion is in contact with the base portion, oscillation of the cushion portion during inflation and deployment can be suppressed, and as a result, the deployment behavior can be stabilized. Due to this, according to this configuration, a deployment behavior in which the cushion portion is deployed toward the vehicle cabin can occur in the cushion portion efficiently.

The bracket may have a planar shape and have a step that is formed in a lower portion of the vehicle fixing portion so as to extend along the width direction of the vehicle fixing portion so that the base portion is separated from the wall toward the vehicle interior side. With this configuration, the wrapping member is prevented from being sandwiched between the bracket and the wall. Thus, it is possible to prevent the wrapping member from being fixed in a twisted state and having an adverse effect on the attitude of the cushion portion, for example. Moreover, the position of the cushion portion in the accommodated state can be adjusted by the step allowing the base portion to protrude further toward the vehicle interior side, for example.

Both ends in a longitudinal direction of the insertion hole may be curved upward. With this configuration, concentration of stress on both ends of the insertion hole can be suppressed and the occurrence of cracks or the like can be prevented.

The curtain airbag device may have a cover that covers a portion of the cushion portion along a longitudinal direction of the cushion portion in the accommodated form, and after the wrapping member is wrapped, the protruding portions may be inserted into the cover so as to be connected to the cover. Due to the cover, it is possible to prevent the occurrence of an unexpected behavior (for example, a rotating behavior) when the cushion portion is inflated and deployed and to allow the cushion portion to be deployed in an intended direction efficiently. Further, since a structure in which the cushion portion and the cover are connected by the protruding portions, the cushion portion and the cover can be united easily.

The curtain airbag device may have a cover that covers a portion of the cushion portion along a longitudinal direction of the cushion portion in the accommodated form, and each of the protruding portions may have a hole in a distal end thereof so that, after the wrapping member is wrapped, a pin of the cover is inserted into the hole so as to be connected to the protruding portion. With this configuration, the cover can prevent the occurrence of an unexpected behavior of the cushion portion and allow the cushion portion to be deployed efficiently. Further, the bracket or the like and the cover can be united easily.

Each of the protruding portions may have a hole in a distal end thereof, and a clip may be attached to the hole after the wrapping member is wrapped. According to this configuration, the wrapping member can be prevented from being detached from the bracket.

According to the present invention, it is possible to provide a curtain airbag device capable of connecting a cushion portion and a bracket with a simple structure and a simple operation and maintaining an accommodated form of the cushion portion reliably.

DETAILED DESCRIPTION

Preferred embodiments of the present invention will be explained next in detail with reference to accompanying drawings. Dimensions, materials, other specific numerical values and the like given in the embodiments are only illustrative in character, for the sake of easier understanding of the invention, and, unless particularly stated otherwise, are not meant to limit the present invention in any way. In the description and the drawings, elements having substantially the same function and configuration are denoted by identical reference numerals, and a recurrent explanation thereof will be omitted. Elements that are not directly related to the present invention are omitted in the drawings.

Figure 1:
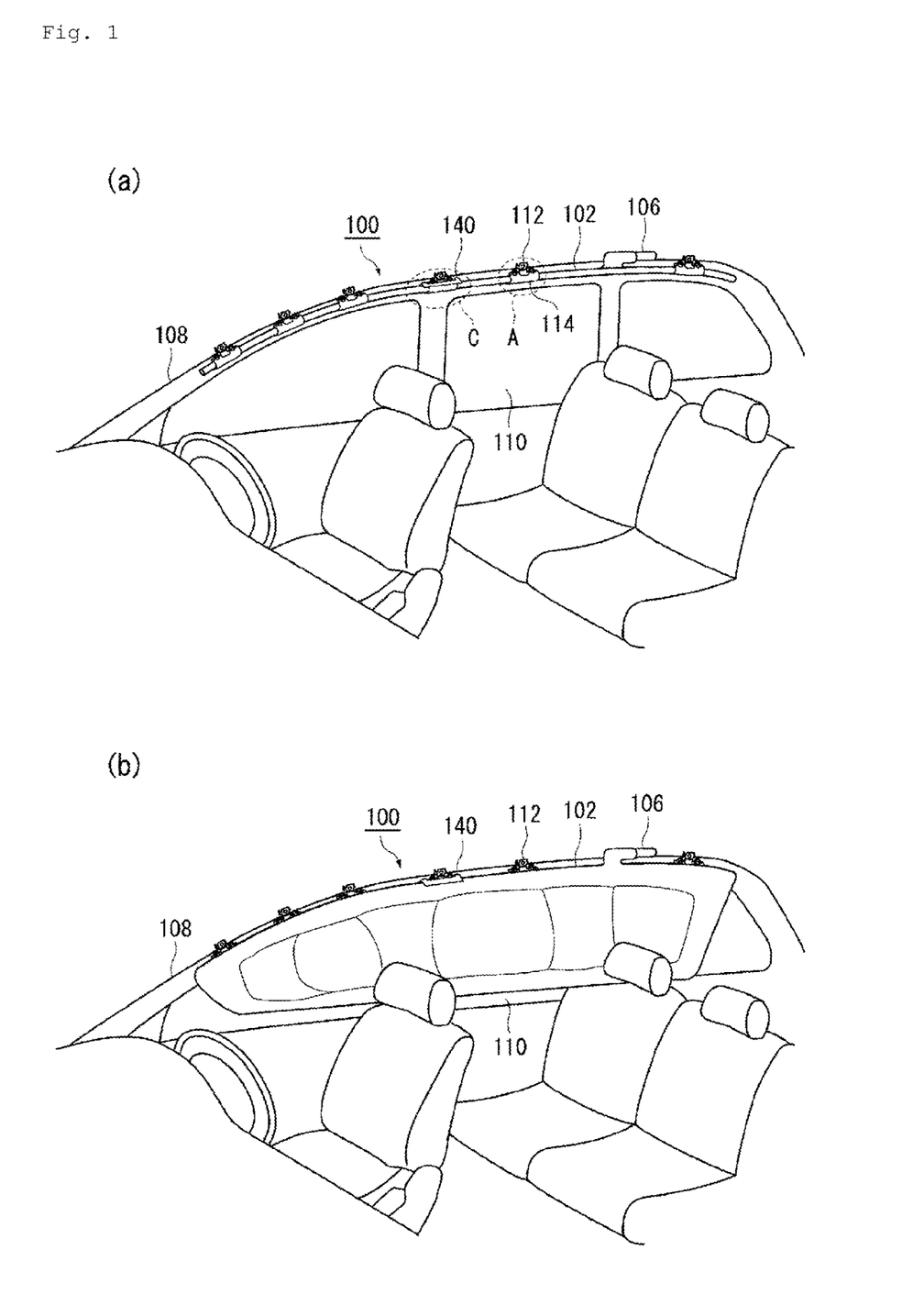
FIGS. 1A and 1B are diagrams illustrating a curtain airbag device according to an embodiment of the present invention.

FIGS. 1A and 1B are diagrams illustrating a curtain airbag device according to an embodiment of the present invention. FIG. 1A illustrates an accommodated form of a cushion portion 102 of a curtain airbag device (hereinafter referred to as an "airbag 100"), and FIG. 1B illustrates the cushion portion 102 in a deployed state. The technical ideas of the present invention are not limited to a curtain airbag, but can be broadly used in an airbag device such as a side airbag in which a cushion portion is accommodated in a rolled or folded state or form.

The cushion portion 102 illustrated in FIG. 1A is a portion that is inflated and deployed in an emergency situation to protect an occupant. The cushion portion 102 is rolled and accommodated in a narrow and long form in a front-rear direction of a vehicle and is mounted by being attached to a wall (a roof side rail 104) above a side surface of a vehicle interior. In general, since the roof side rail 104 is covered by a roof trim (not illustrated), the accommodated cushion portion 102 is not visible from the vehicle interior. Although the accommodated form of the cushion portion 102 of this embodiment is realized by winding or rolling, the accommodated form may be realized by folding or the like.

The airbag 100 includes an inflator 106 which is a gas generator. The cushion portion 102 is inflated with the pressure of gas supplied from the inflator 106 to thereby restrain an occupant. In the state of FIG. 1A, when a side collision, a rollover (overturning), or the like occurs in a vehicle 108, sensors (not illustrated) provided in the vehicle 108 detect an impact first, and then, a signal is sent to the inflator 106. The inflator 106 may be one of several types, such as an inflator which uses combustion gas and/or an inflator which uses compressed gas. Upon receiving the signal, the inflator 106 supplies either one or both of the gases to the cushion portion 102. Upon being supplied with the gas from the inflator 106, the cushion portion 102 is inflated and deployed downward along a side surface (a side window 110 or the like) of a vehicle cabin to thereby protect the occupant as illustrated in FIG. 1B.

In this embodiment, the cushion portion 102 is formed by weaving using one-piece woven (OPW). As another example, the cushion portion 102 may be formed by sewing two base fabrics that form the surface or bonding the two base fabrics. According to these methods, the cushion portion 102 is formed in a bag form.

A plurality of brackets 112 is provided in an upper portion of the airbag 100 so as to attach the cushion portion 102 to the vehicle 108. The bracket 112 is a metal member and is fixed to the roof side rail 104 after being connected to the cushion portion 102.

Figure 2:
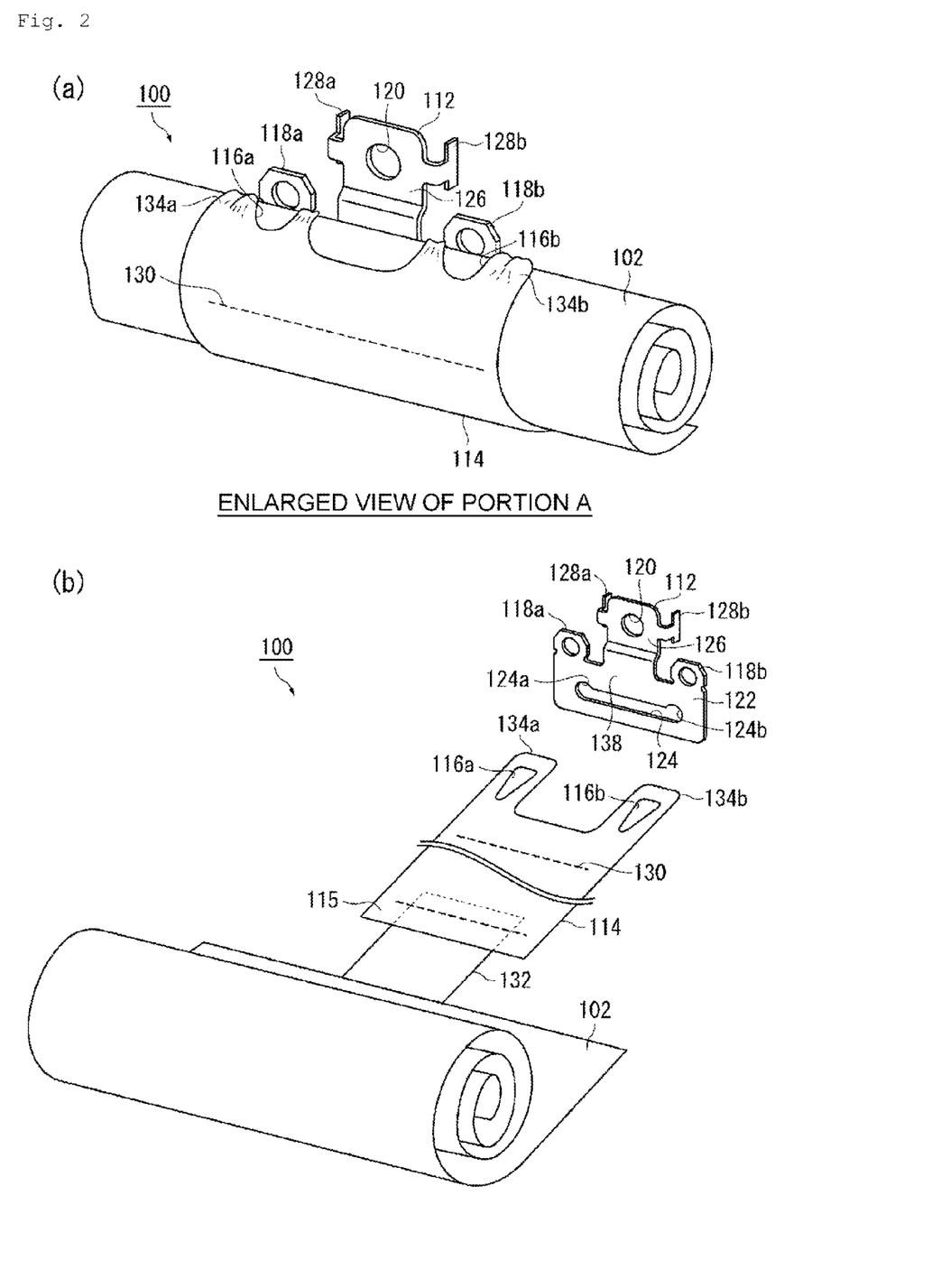
FIGS. 2A and 2B are diagrams illustrating a configuration of the portion encircled at A in FIG. 1A.

FIGS. 2A and 2B are diagrams illustrating a configuration of the portion encircled at A of FIG. 1B. FIG. 2A is an enlarged perspective view of the vicinity of the bracket 112 and FIG. 2B is an exploded view of FIG. 2A. As illustrated in FIG. 2B, a strip-shaped wrapping member 114 is provided in an upper edge of the cushion portion 102. Hooking holes 116a and 116b are formed in both ends in a width direction of a distal end of the wrapping member 114. After the wrapping member 114 is wrapped, when the hooking holes 116a and 116b are hooked on protruding portions 118a and 118b of the bracket 112, respectively, the cushion portion 102 in the accommodated form is connected to the bracket 112 as illustrated in FIG. 2A.

The bracket 112 illustrated in FIG. 2B is formed by applying bending processing or the like to a planar metal. A bolt hole 120 is formed in the bracket 112, and a bolt (not illustrated) passes through the bolt hole 120 whereby the bracket 112 is fastened to the roof side rail 104 (see FIG. 1B).

Respective portions of the bracket 112 will be described. First, a base portion 122 is a portion which is provided in a lower part of the bracket 112 and has a horizontally long insertion hole 124. The wrapping member 114 passes through the insertion hole 124. Both ends 124a and 124b in the longitudinal direction of the insertion hole 124 have an upwardly curved shape. Due to this, concentration of stress when a load is applied from the wrapping member 114, for example, is suppressed and the occurrence of cracks or the like is prevented. Moreover, this shape has an effect of preventing the wrapping member 114 from being folded and twisted at both ends 124a and 124b.

A vehicle fixing portion 126 extends upward from the base portion 122 in a rectangular shape. The above-described bolt hole 120 and hooking portions 128a and 128b are formed in the vehicle fixing portion 126, and the hooking portions 128a and 128b are formed in lateral edges in the width direction so as to face the vehicle side (the deeper right side in the drawing). The hooking portions 128a and 128b are positioning portions used when attaching the bracket 112 and are inserted in the roof side rail 104 before the bolt is fastened into the bolt hole 120.

The protruding portions 118a and 118b are formed on both sides in the width direction of the vehicle fixing portion 126 in an upper portion of the base portion 122. The protruding portions 118a and 118b have such a shape that protrudes upward from the base portion 122, and the hooking holes 116a and 116b of the wrapping member 114 are hooked on the protruding portions 118a and 118b.

In this embodiment, as illustrated in FIG. 2A, the wrapping member 114 is wrapped around the cushion portion 102 and the bracket 112 in order to maintain the accommodated form of the cushion portion 102 and to connect the cushion portion 102 and the bracket 112. The wrapping member 114 is formed of a breakable material so that the wrapping member 114 breaks with inflation and deployment of the cushion portion 102 so as to open the cushion portion 102. A broken line-shaped slit 130 may be formed in the wrapping member 114 as a weak portion so that breaking occurs smoothly.

Figure 3:
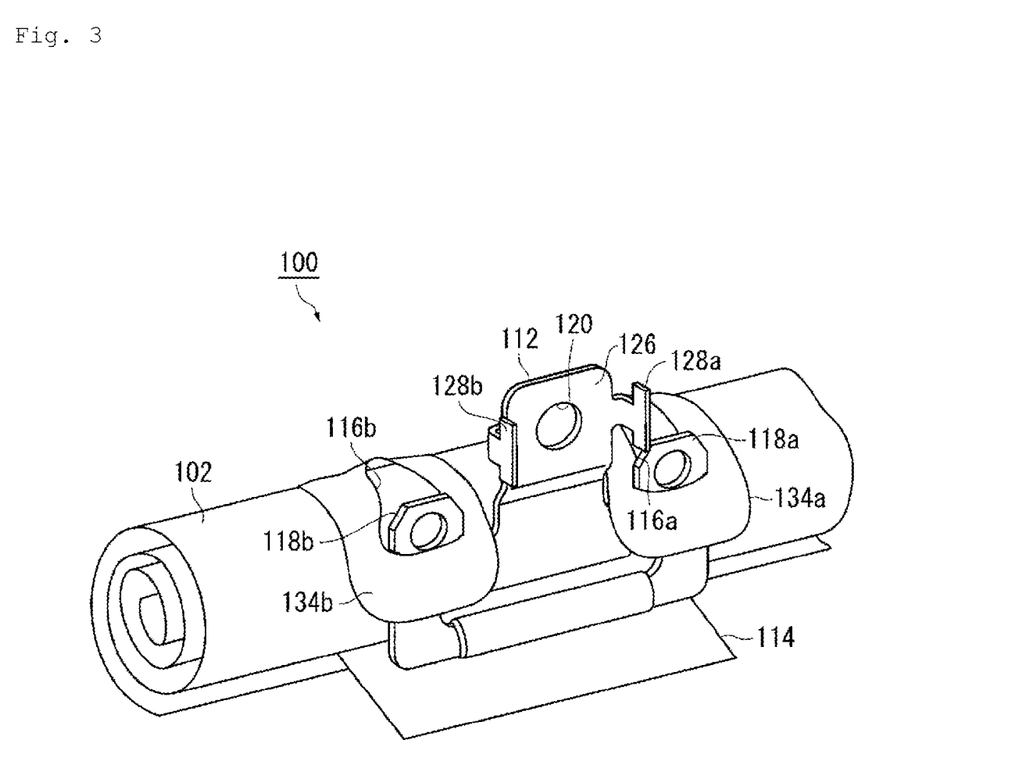
FIG. 3 is a diagram illustrating the rear side of the portion seen in FIG. 2A.

The wrapping member 114 has a root portion 115 which is sewn and connected to a tab 132 on the upper edge of the cushion portion 102. Projecting pieces 134a and 134b are formed on a distal end side of the wrapping member 114 on both ends in the width direction, and the hooking holes 116a and 116b are formed in the projecting pieces 134a and 134b, respectively. FIG. 3 is a diagram illustrating the rear side of FIG. 2A. As illustrated in FIG. 3, the hooking holes 116a and 116b are hooked on the protruding portions 118a and 118b of the bracket 112 whereby the wrapping member 114 is installed in a wrapped state. Although the wrapping member 114 is formed of a non-woven fabric, it is preferable that the wrapping member 114 has stretching properties because the hooking holes 116a and 116b are more easily hooked on the protruding portions 118a and 118b, respectively. Further, as will be described later, in this embodiment, since the height of the protruding portions 118a and 118b is lower than the vehicle fixing portion 126, when the wrapping member 114 is wrapped to hook the hooking holes 116a and 116b of the projecting pieces 134a and 134b, the fabric of the wrapping member 114 may have a small margin. By doing so, it is possible to shorten the wrapping member 114 itself and to eliminate the looseness. Thus, the diameter of the cushion portion 102 after wrapping can be reduced.

Figure 4:
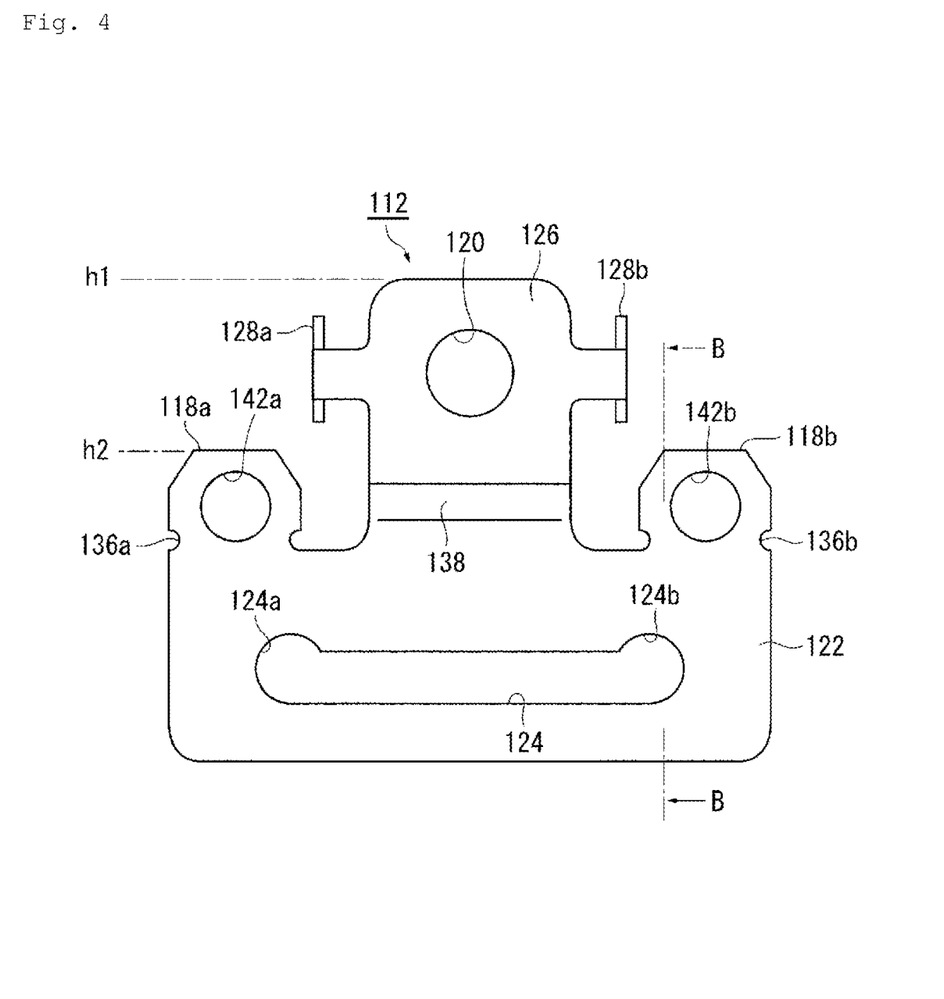
FIG. 4 is a diagram illustrating the bracket of FIG. 2B when seen from the front side and the vehicle interior.

FIG. 4 is a diagram illustrating the bracket 112 of FIG. 2B when seen from the front side of the vehicle interior side. As illustrated in FIG. 4, neck portions 136a and 136b are formed on the roots of the protruding portions 118a and 118b close to the base portion 122, the width of the neck portions 136a and 136b being smaller than that of other regions of the protruding portions 118a and 118b. This structure makes it easy to hook the hooking holes 116a and 116b of the wrapping member 114 of FIG. 2B to thereby facilitate the operation and stabilize the accommodated form.

The protruding portions 118a and 118b, measured from the bottom of the bracket 112, are set to a height (h2) lower than at least the height h1 of the vehicle fixing portion 126. This configuration allows the wrapping member 114 of FIG. 2B to be hooked efficiently. The purpose of this configuration will be described with reference to FIGS. 5A to 5C.

Figure 5:
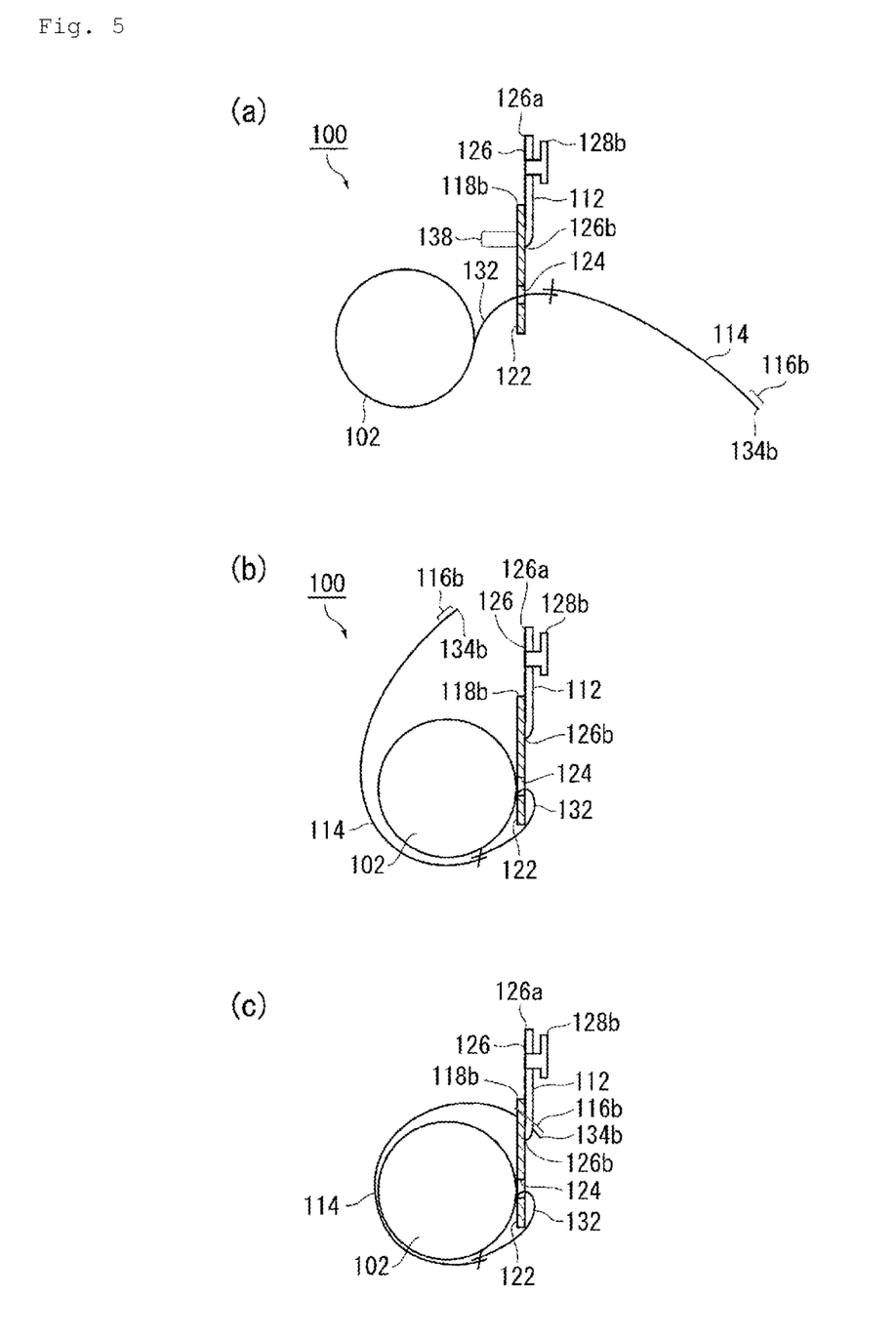
FIGS. 5A, 5B and 5C are diagrams illustrating the process by which a wrapping member of FIG. 2B is wrapped.

FIGS. 5A to 5C are diagrams illustrating the process by which the wrapping member 114 of FIG. 2B is wrapped. These respective drawings correspond to the cross-section generally taken along line B-B of FIG. 4. First, as illustrated in FIG. 5A, the wrapping member 114 is inserted into the insertion hole 124 from the vehicle interior side (the left side in the drawing). Subsequently, as illustrated in FIG. 5B, the wrapping member 114 is folded back downward, rolled further toward the vehicle interior side (the left side in the drawing), and wrapped around the cushion portion 102 in the accommodated form. After that, as illustrated in FIG. 5C, the hooking hole 116b is hooked on the protruding portion 118b whereby the wrapping member 114 is installed.

In the process of hooking the wrapping member 114 illustrated in FIG. 5C, if a structure in which the wrapping member 114 is hooked on the vehicle fixing portion 126 is used, the wrapping member 114 needs to have such a length that the hooking hole 116b reaches an upper end 126a of the vehicle fixing portion 126. When the wrapping member 114 has such a length, the wrapping member 114 may sag when the hooking hole reaches up to the root 126b of the vehicle fixing portion 126. Thus, in the present embodiment, as described with reference to FIG. 4, the wrapping member 114 is hooked on the protruding portion 118b (and the protruding portion 118a) that is lower in height than the vehicle fixing portion 126. By doing so, even when the wrapping member 114 is relatively short, the wrapping member 114 can be wrapped and the possibility of sagging after it is wrapped is eliminated as much as possible. Moreover, it is possible to reduce the diameter of the roll-shaped cushion portion 102.

Due to these configurations described above, in this embodiment, it is possible to connect the cushion portion 102 and the bracket 112 with a simple structure and a simple process. Moreover, it is possible to maintain the accommodated form of the cushion portion 102 reliably without any sagging and to stabilize the deployment behavior.

Next, this embodiment will be with reference to FIG. 5C again. In this embodiment, the cushion portion 102 in the accommodated form is mounted on the vehicle 108 (see FIG. 1A) in contact with the vehicle interior side (the left side in the drawing) of the base portion 122. Due to this configuration, the cushion portion 102 can receive repulsive force applied from the base portion 122 toward the vehicle interior side during inflation and deployment. Moreover, since the cushion portion 102 is in contact with the base portion 122, oscillation of the cushion portion 102 during inflation and deployment is suppressed, and as a result, the deployment behavior is stabilized. In the airbag 100, a deployment behavior in which the cushion portion 102 is deployed in an intended direction can occur in the cushion portion 102 efficiently.

As illustrated in FIG. 2A and FIG. 4, a step 138 is formed in a lower portion of the vehicle fixing portion 126 of the bracket 112 so that the base portion 122 is separated from the wall (the roof side rail 104 of FIG. 1A) toward the vehicle interior side. This step 138 is formed along the width direction of the vehicle fixing portion 126 as illustrated in FIG. 4. With this configuration, the wrapping member 114 is prevented from being sandwiched between the bracket 112 and the roof side rail 104. Thus, it is possible to prevent the wrapping member 114 from being fixed in a twisted state and having an adverse effect on the attitude of the cushion portion 102, for example. Moreover, the position of the cushion portion 102 in the accommodated state can be adjusted by the step 138 allowing the base portion 122 to protrude further toward the vehicle interior side, for example.

Figure 6:
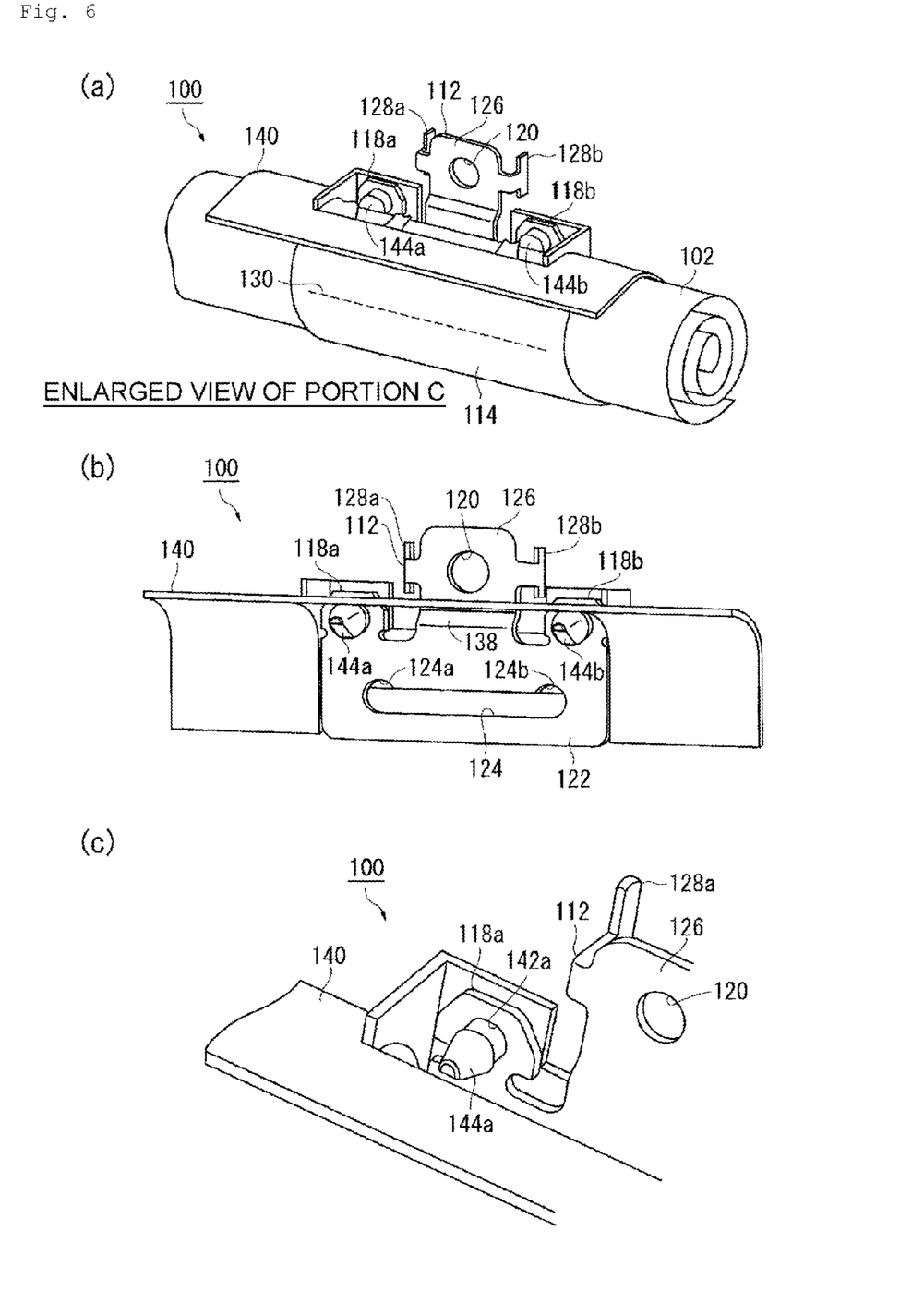
FIGS. 6A, 6B and 6C are diagrams illustrating the portion encircled at C in FIG. 1A.

Next, this embodiment will be described with reference to FIG. 1A again. As illustrated in FIG. 1A, in this embodiment, a cover 140 can be attached to the cushion portion 102. FIGS. 6A to 6C are diagrams illustrating the portion encircled at C in FIG. 1A, and FIG. 6A is an enlarged perspective view of the portion at C. The cover 140 of FIG. 6A is formed of a resin, has a shape that extends along the longitudinal direction of the cushion portion 102 in the accommodated form, and covers a portion of the cushion portion 102. The cover 140 has an effect of preventing the occurrence of an unexpected behavior (for example, a rotating behavior) when the cushion portion 102 is inflated and deployed. Due to this, the cushion portion 102 can be deployed in an intended direction (for example, the interior direction) efficiently.

In this embodiment, the bracket 112 can be connected to the cover 140 using the protruding portion 118a. As illustrated in FIG. 4, holes 142a and 142b are formed in the distal end of the protruding portion 118a. FIG. 6B is a diagram illustrating the inner side of the cover 140 with the cushion portion 102 of FIG. 6A removed. Pins 144a and 144b are provided in the cover 140. The pins 144a and 144b are inserted into the holes 142a and 142b whereby the bracket 112 and the cover 140 are connected.

FIG. 6C is an enlarged view of the pin 144a of FIG. 6B. The pin 144a protrudes toward the vehicle interior side (the front side in the drawing). With this pin 144a, the bracket 112 and the cover 140 can be united easily. In this case, since the step 138 (see FIG. 6B) is formed in the bracket 112, even when the bracket 112 and the cover 140 are united, the vehicle fixing portion 126 can make contact with the roof side rail 104 (see FIG. 1A) of the vehicle.

First Modification

Figure 7:
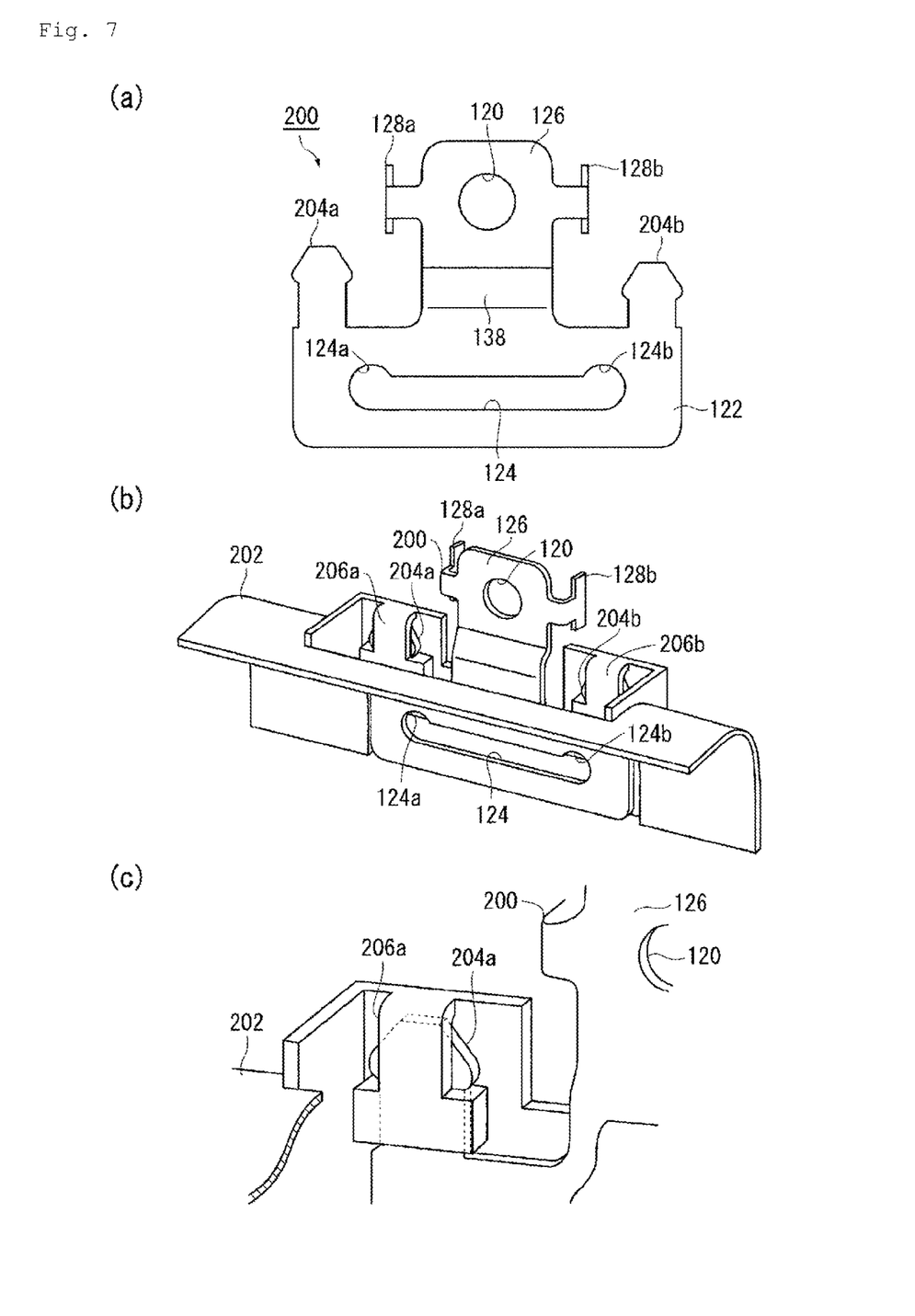
FIGS. 7A, 7B and 7C are diagrams illustrating a modification of a curtain airbag device according to an embodiment of the present invention.

FIGS. 7A to 7C are diagrams illustrating a first modification of the curtain airbag device according to the embodiment of the present invention. A bracket 200 illustrated in FIG. 7A and a cover 202 illustrated in FIG. 7B are different from those illustrated in FIGS. 6A to 6C and other drawings in their shapes.

FIG. 7A corresponds to FIG. 4 and illustrates the bracket 200. The basic configuration and function of the bracket 200 are the same as those of the bracket 112 of FIG. 4. Protruding portions 204a and 204b are portions on which the hooking holes 116a and 116b of the wrapping member 114 (FIG. 2B) are hooked, respectively, and are lower in height than the vehicle fixing portion 126 similarly to the protruding portions 118a and 118b of FIG. 4. However, the protruding portions 204a and 204b have a shape approximate to a rounded triangular or trapezoidal shape. In this airbag, the bracket 200 can be connected to a cover 202 using the protruding portions 204a and 204b.

FIG. 7B is a diagram illustrating a state in which the bracket 200 of FIG. 7A is connected to the cover 202. The cover 202 has a function of stabilizing the behavior of the cushion portion 102 (see FIG. 6A) similarly to the cover 140 of FIG. 6A. Insertion portions 206a and 206b in which the protruding portions 204a and 204b of the bracket 200 are inserted, respectively, are formed in the cover 202. FIG. 7C is an enlarged view of the insertion portion 206a of FIG. 7B. In FIG. 7C, a portion of the cover 202 is cut away for the sake of convenience in illustrating the insertion portion 206a and protruding portion 204a. The protruding portion 204a is inserted into the insertion portion 206a from the lower side. Moreover, both lower ends of the inserted protruding portion 204a perform the role of "barb" whereby the bracket 200 and the cover 202 are connected. With this configuration, the bracket 200 (and the cushion portion 102 (see FIG. 6A)) and the cover 202 can be united easily.

Other Modifications

Figure 8:
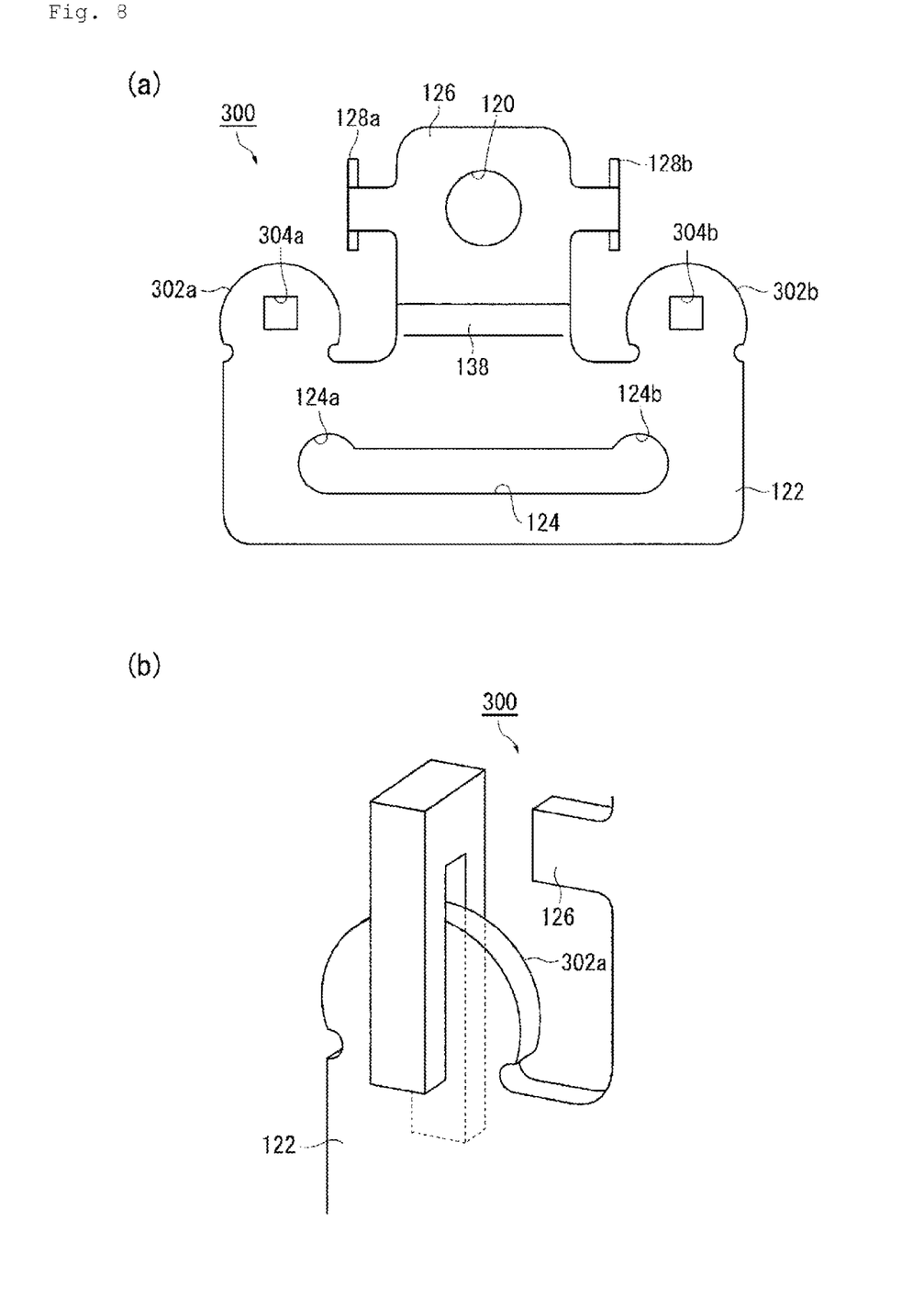
FIGS. 8A and 8B are diagrams illustrating a modification of a bracket.

FIGS. 8A and 8B are diagrams illustrating another modification of the bracket. FIG. 8A corresponds to FIG. 4 and illustrates a bracket 300. The basic function and configuration of this bracket 300 are the same as those of the brackets 112 and 200. For example, protruding portions 302a and 302b are portions on which the hooking holes 116a and 116b of FIG. 2B are hooked, respectively, and are lower in height than the vehicle fixing portion 126. However, the protruding portions 302a and 302b have holes 304a and 304b which have a rectangular shape unlike the holes 142a and 142b of FIG. 4.

FIG. 8B is a diagram illustrating a state in which a clip 310 is attached to the bracket 300 of FIG. 8A. In the bracket 300, after the wrapping member 114 (see FIG. 2B) is installed, the clip 310 can be attached to the hole 304a (and the hole 304b). The clip 310 is formed of a resin and is attached so as to sandwich the protruding portion 302a from both sides. According to this configuration, it is possible to prevent the wrapping member 114 from being detached from the bracket 300.

Figure 9:
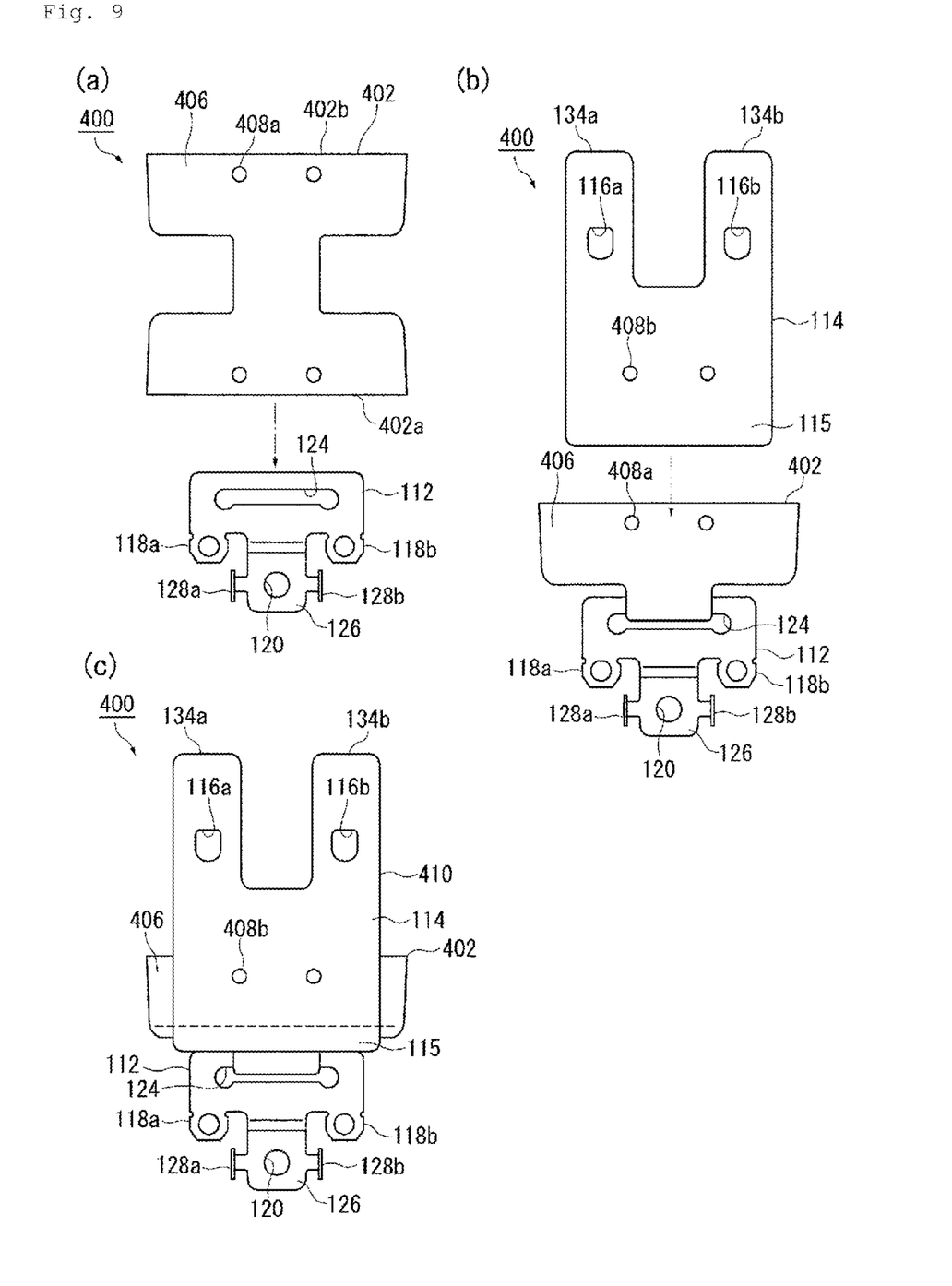
FIGS. 9A, 9B and 9C are diagrams illustrating another modification of a curtain airbag device according to the embodiment of the present invention and the process of its assembly.

FIGS. 9A to 9C are diagrams illustrating still another modification of the curtain airbag device according to the embodiment of the present invention. A curtain airbag device (airbag 400) illustrated in FIGS. 9A to 9C is different from the respective airbags described above in the order of processes of assembling respective members.

FIGS. 9A to 9C each illustrate the process of assembling the airbag 400. When respective members of the airbag 400 are assembled, first, as illustrated in FIG. 9A, a tab 402 is inserted into the insertion hole 124 of the bracket 112, starting from one end 402a side which is the lower side in the drawing. The tab 402 is a fabric member provided on the upper edge of the cushion portion 102 similarly to the tab 132 illustrated in FIG. 2B. The tab 402 of this modification has such a shape that one end 402a on the lower side and the other end 402b on the upper side extend in the left-right direction of the drawing (the front-rear direction of the vehicle) as if a character "H" is rotated by 90°. After the tab 402 is inserted into the insertion hole 124 up to the center in the up-down direction, one end 402a and the other end 402b are superimposed on each other and are bonded by welding or sewing, for example (see FIG. 4B). The shape of the tab 402 is not limited to this, and for example, one end 402a may be formed as a free end that extends simply in a strip form, the tab 402 is inserted into the insertion hole 124, starting from the free end side and the other end 402b may be retained.

Subsequently, as illustrated in FIG. 4B, the wrapping member 114 is connected to the tab 402. Positioning holes 408a and 408b are formed in a base portion 406 (the portion in which one end 402a and the other end 402b of FIG. 4A are combined) of the tab 402 and the wrapping member 114, respectively. When the wrapping member 114 is connected to the tab 402, alignment between the tab 402 and the wrapping member 114 can be realized by inserting predetermined pins (not illustrated) into the positioning holes 408a and 408b. Subsequently, as illustrated in FIG. 9C, the base portion 406 of the aligned tab 402 and the root portion 115 of the wrapping member 114 are connected by basting (as a result, a tab assembly 410 is obtained).

Figure 10:
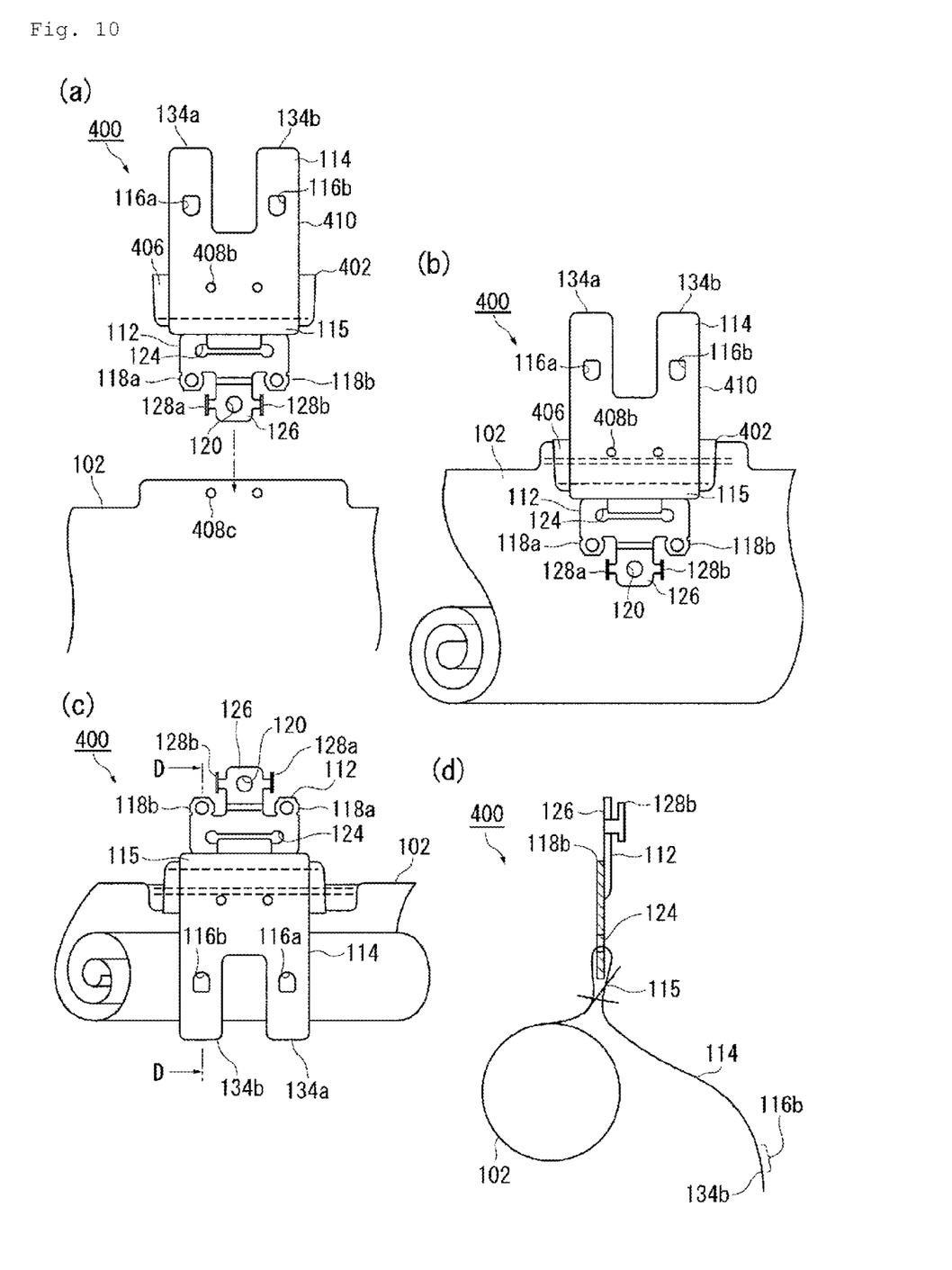
FIGS. 10A, 10B, 10C and 10D are diagrams illustrating the process in which the curtain airbag device is assembled, continued from FIGS. 9A to 9C.

FIGS. 10A to 10D are diagrams illustrating the process of assembling the curtain airbag device (the airbag 400) continued from FIGS. 9A to 9C. As illustrated in FIG. 10A, in this modification, since a positioning hole 408c is formed in the upper edge of the cushion portion 102, the alignment of the tab assembly 410 can be realized using a predetermined pin. The aligned tab assembly 410 is connected to the cushion portion 102 by lockstitch as illustrated in FIG. 10B. After the tab assembly 410 and the cushion portion 102 are assembled, the cushion portion 102 is rolled from the lower side to form a roll.

After the cushion portion 102 is rolled, as illustrated in FIG. 10C, the tab assembly 410 is stood up so that the bracket 112 is located above the cushion portion 102. FIG. 10D is a diagram corresponding to the D-D cross-section of FIG. 10C. From the state of FIG. 10D, assembling is performed similarly to that described in FIGS. 5A to 5C. That is, the wrapping member 114 is wrapped around the cushion portion 102 in the accommodated form from the root portion 115 toward the vehicle interior side on the lower side of the bracket 112, and the hooking holes 116a and 116b are hooked and locked on the protruding portions 118a and 118b, respectively. In this case, when the wrapping member 114 is wrapped so as to fasten the rolled cushion portion 102 tightly to a certain degree, the diameter of the cushion portion 102 can be reduced effectively and the force of maintaining the rolled state can be improved effectively.

In this manner, even when the tab 402 and the wrapping member 114 are included, it is possible to connect the cushion portion 102 and the bracket 112 with a simple process. Moreover, in this modification, since a structure in which the wrapping member 114 is hooked on the protruding portions 118a and 118b is used, it is possible to wrap the wrapping member 114 without any sagging while avoiding interference between the wrapping member 114 and the vehicle fixing portion 126. Therefore, it is possible to maintain the accommodated form of the cushion portion 102 reliably and to stabilize the deployment behavior.

Preferred embodiments of the present invention have been described above with reference to accompanying drawings, but the described embodiments are exemplary, and the invention may be embodied and implemented in other ways, in accordance with various methods. Unless specifically indicated in the description of the present application, the invention is not restricted by the shape, size, configurational arrangement and so forth of the detailed parts depicted in the drawings. Furthermore, the expressions and terms used in the description of the present application are explanatory in purpose, and are not meant to be limiting in any way, unless restricting subject matter to that effect is specifically set forth in the description.

Therefore, a person skilled in the art can devise various alterations or modifications within the scope as set forth in the claims, and it is to be understood that these alterations and modifications belong, as a matter of course, to the technical scope of the present invention.

In the embodiments, examples have been described wherein the airbag 100 according to the present invention is used in an automobile, but the present invention can be used, besides automobiles, also in aircraft and ships, to elicit similar effects.

The present invention can be used in a curtain airbag having a cushion portion that is inflated and deployed along a side surface of a vehicle interior for the purpose of protecting occupants in the event of a side collision or a rollover (overturning) of a vehicle.

What is claimed is:

1. A curtain airbag device comprising:
a cushion portion mounted on a vehicle in an accommodated form having a long and narrow shape by being rolled or folded;
a bracket attached to a portion inside a cabin of the vehicle; and
a wrapping member having a strip shape, the wrapping member being wrapped around the cushion portion in the accommodated form and the bracket and connecting the cushion portion to the bracket, wherein
the bracket includes:
a base portion having an elongated insertion hole extending longitudinally with respect to the vehicle;
a vehicle fixing portion which extends upward from the base portion and makes contact with and is fixed to the portion inside the cabin; and
protruding portions that protrude upward from the base portion on both sides in a width direction of the vehicle fixing portion, the protruding portions being located at a height from the base portion that is lower in height than the vehicle fixing portion is from the base portion, wherein the bracket has a flat planar portion that includes the protruding portions and the base portion extending together in a plane that is transverse to a direction towards an interior of the cabin of the vehicle,
the wrapping member including a root portion connected to an upper edge of the cushion portion and further including hooking holes provided in a width direction on both lateral sides of a distal end of the wrapping member, and
the wrapping member extending from the root portion into the insertion hole and then being folded back toward a lower side of the bracket from the insertion hole, rolled inwardly of the vehicle from the lower side of the bracket, wrapped around the cushion portion in the accommodated form, and hooked by the hooking holes on the protruding portions.

2. The curtain airbag device according to claim 1, wherein each of the protruding portions has a neck portion which is formed close to the base portion and has a smaller width than that of an adjacent end part of the protruding portion.

3. The curtain airbag device according to claim 1, wherein the wrapping member is stretchable.

4. The curtain airbag according to claim 1, wherein the wrapping member is formed of a non-woven fabric.

5. The curtain airbag device according to claim 1, wherein, when mounted to the vehicle, the cushion portion in the accommodated form is in contact with a vehicle interior side of the base portion.

6. The curtain airbag device according to claim 1, wherein the insertion hole is elongated in a longitudinal direction of the vehicle, and longitudinal ends of the insertion hole are curved upward.

7. The curtain airbag device according to claim 1, wherein the curtain airbag device includes a cover that covers a portion of the cushion portion along a longitudinal direction of the cushion portion in the accommodated form, and
after the wrapping member is wrapped about the cushion portion, the protruding portions are inserted into and connected to the cover.

8. The curtain airbag device according to claim 1, wherein the curtain airbag device includes a cover that covers a portion of the cushion portion along a longitudinal direction of the cushion portion in the accommodated form, and
each of the protruding portions has a hole in a distal end thereof so that, after the wrapping member is wrapped, a pin of the cover inserted into the hole connects the cover to the protruding portion.

9. The curtain airbag device according to claim 1, wherein each of the protruding portions has a hole in a distal end thereof, a clip attached to the hole after the wrapping member is wrapped secures the wrapping member to the protruding portions.

10. The curtain airbag device according to claim 1, wherein the wrapping member has a weakened portion configured to break with inflation and deployment of the cushion portion.

11. The curtain airbag device according to claim 10, wherein the weakened portion is a slit formed in a broken line shape.

12. A curtain airbag device comprising:
a cushion portion mounted on a vehicle in an accommodated form having a long and narrow shape by being rolled or folded;
a bracket attached to a wall inside a cabin of the vehicle;
a fabric tab that connects the bracket and the cushion portion; and
a wrapping member having a strip shape, wrapped around the bracket and the cushion portion in the accommodated form so as to connect the cushion portion and the bracket, wherein
the bracket further including:
a base portion having an insertion hole;
a vehicle fixing portion which extends upward from the base portion and makes contact with and is fixed to the wall; and
protruding portions that protrude upward from the base portion on both sides of the vehicle fixing portion in a width direction, the protruding portions being located at a position lower in height from the base portion than the vehicle fixing portion is from the base portion, wherein the bracket has a flat planar portion that includes the protruding portions and the base portion extending together in a plane that is transverse to a direction towards an interior of the cabin of the vehicle,
the tab being inserted into the insertion hole of the bracket and connected to an upper edge of the cushion portion,
the wrapping member having a root portion connected to at least one of the upper edge of the cushion portion and the tab, the wrapping member also having hooking holes provided on both lateral sides in a width direction of a distal end of the wrapping member, and
the wrapping member being rolled toward the interior of the cabin of the vehicle from the root portion about a lower side of the bracket, being wrapped around the cushion portion in the accommodated form, and being hooked by the hooking holes on the protruding portions.

13. The curtain airbag device according to claim 12, wherein each of the protruding portions has a neck portion which is formed close to the base portion and has a smaller width than that of an adjacent end part of the protruding portion.

14. The curtain airbag device according to claim 12, wherein the wrapping member is stretchable.

15. The curtain airbag according to claim 12, wherein the wrapping member is formed of a non-woven fabric.

16. The curtain airbag device according to claim 12, wherein, when mounted to the vehicle, the cushion portion in the accommodated form is in contact with a vehicle interior side of the base portion.

17. The curtain airbag device according to claim 12, wherein the bracket has a generally planar shape and includes a step formed in a lower portion of the vehicle fixing portion, the step extending in the width direction of the vehicle so that the base portion is separated from the wall in a direction toward the interior of the cabin of the vehicle.

18. The curtain airbag device according to claim 12, wherein the insertion hole is elongated in a longitudinal direction of the vehicle, and longitudinal ends of the insertion hole are curved upward.

19. The curtain airbag device according to claim 12, wherein the curtain airbag device includes a cover that covers a portion of the cushion portion along a longitudinal direction of the cushion portion in the accommodated form, and
after the wrapping member is wrapped about the cushion portion, the protruding portions are inserted into and connected to the cover.

20. The curtain airbag device according to claim 12, wherein the curtain airbag device includes a cover that covers a portion of the cushion portion along a longitudinal direction of the cushion portion in the accommodated form, and
each of the protruding portions has a hole in a distal end thereof so that, after the wrapping member is wrapped, a pin of the cover inserted into the hole connects the cover to the protruding portion.

21. The curtain airbag device according to claim 12, wherein each of the protruding portions has a hole in a distal end thereof, a clip attached to the hole after the wrapping member is wrapped secures the wrapping member to the protruding portions.

22. The curtain airbag device according to claim 12, wherein the wrapping member has a weakened portion configured to break with inflation and deployment of the cushion portion.

23. The curtain airbag device according to claim 22, wherein the weakened portion is a slit formed in a broken line shape.

24. A curtain airbag device comprising:
a cushion portion mounted on a vehicle in an accommodated form having a long and narrow shape by being rolled or folded;
a bracket attached to a portion inside a cabin of the vehicle; and
a wrapping member having a strip shape, the wrapping member being wrapped around the cushion portion in the accommodated form and the bracket and connecting the cushion portion to the bracket, wherein
the bracket includes:
a base portion having an elongated insertion hole extending longitudinally with respect to the vehicle;
a vehicle fixing portion which extends upward from the base portion and makes contact with and is fixed to the portion inside the cabin; and
protruding portions that protrude upward from the base portion on both sides in a width direction of the vehicle fixing portion, the protruding portions being located at a height from the base portion that is lower in height than the vehicle fixing portion is from the base portion,
the wrapping member including a root portion connected to an upper edge of the cushion portion and further including hooking holes provided in a width direction on both lateral sides of a distal end of the wrapping member, and
the wrapping member extending from the root portion into the insertion hole and then being folded back toward a lower side of the bracket from the insertion hole, rolled inwardly of the vehicle from the lower side of the bracket, wrapped around the cushion portion in the accommodated form, and hooked by the hooking holes on the protruding portions, wherein the bracket has a generally planar shape and includes a step formed in a lower portion of the vehicle fixing portion, the step extending in a width direction of the vehicle so that the base portion is separated from the wall in a direction toward an interior of the cabin of the vehicle.

* * * * *